Sept. 6, 1966  J. R. YOUNG ET AL  3,270,959

INDICATOR

Filed Feb. 17, 1964  3 Sheets-Sheet 1

INVENTORS
JAMES R. YOUNG
ROBERT L. MILLS
BY
Albert L. Jeffers
ATTORNEY

INVENTORS
JAMES R. YOUNG
ROBERT L. MILLS
BY
Albert L. Jeffers
ATTORNEY

INVENTORS
JAMES R. YOUNG
ROBERT L. MILLS

BY Albert L. Jeffers

ATTORNEY

United States Patent Office 3,270,959
Patented Sept. 6, 1966

3,270,959
INDICATOR
James R. Young and Robert L. Mills, Fort Wayne, Ind., assignors to Planet Instrument, Inc., Fort Wayne, Ind., a corporation of Indiana
Filed Feb. 17, 1964, Ser. No. 345,166
6 Claims. (Cl. 235—110)

This invention relates to an indicator, and more particularly, to a mechanically actuated indicator device which is adapted to serve a substantially variety of indicator functions, including that of serving as a calculator, a measuring device, a timer, teleprompter and such other functions of a similar nature.

In previous indicator devices, there is generally included a combination of costly gearing which is used for co-ordinating various mechanical movements adapted for positioning indicia wheels, the wheels in turn having printed or provided on viewable faces, items of information either in the form of numerical values, symbols, or the like which provide a required piece of information in accordance with the mechanical movement of the device. Such indicators have been generally unsatisfactory by reason of the considerable expense involved in their manufacture and use and also, owing to the complexity of the mechanical construction, such indicators are prone to mechanical failure and require extensive servicing when malfunctioning.

Also, indicators of the class described necessitate a substantial operating torque and tend to be bulky and, therefore, have limited applications where the input driving force is small or where available space is limited.

Accordingly, it is one of the principal objects of the present invention to provide a new and improved indicator device which is adapted to serve a variety of different functional uses, but is at the same time both simple in operation and construction, in order to provide a compact and inexpensive article which is characterized by a troubled-free operation.

It is a further object of the present invention to provide a mechanically operated indicator device which has a reduced operating torque so it can be made responsive to relatively low orders of input driving force, making it possible to measure or provide information concerning a variety of different subjects. Also, because the indicator has a very low power requirement, it is not wasteful of power and can be used without subtracting substantially from the main input driving force.

One of the important features of the present invention is that it has been possible to eliminate costly gearing and timing mechanisms which contributed substantially to the original cost of the apparatus, and also, contributed to substantial servicing expense when the device would malfunction.

It is another important feature of the present invention that the indicia is printed, or displayed on one of the polygonal sidefaces of the respective indicator member. At the time of display, the material is in precise reading alignment to facilitate accurate reading.

In accordance with the present invention there are provided a number of relatively inexpensive indexable means which are correlated so that the information provided on successive indexing means will yield an intelligible pattern of information concerning the subject being examined.

Other objects and features of the present invention will become apparent from a consideration of the following description, which proceeds with reference to the accompanying drawings wherein.

Figure 3:
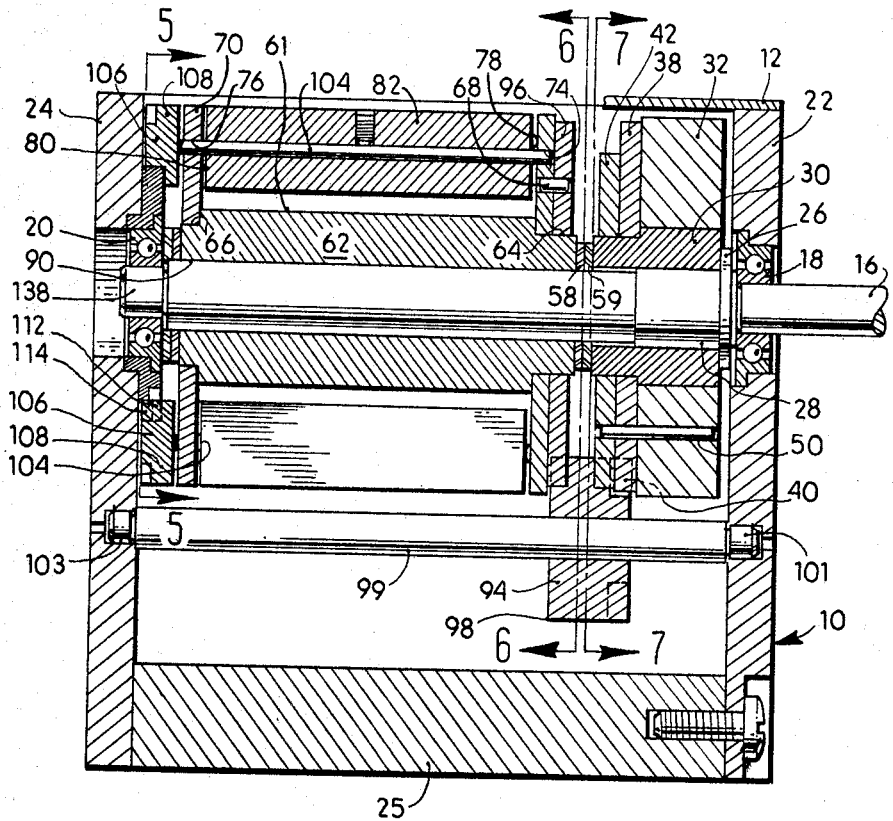
FIGURE 3 is an enlarged section view taken midway through the device illustrated in FIGURES 1 and 2.
Figure 5:
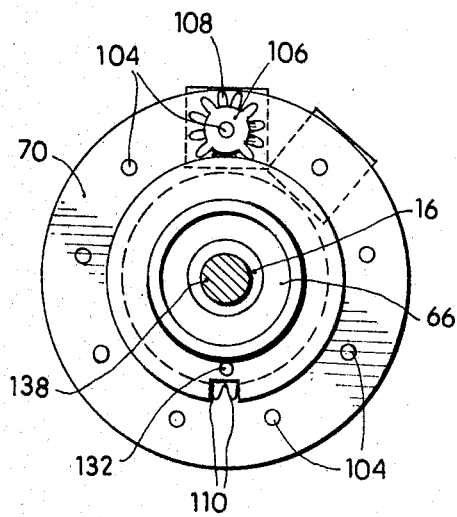
Figure 6:
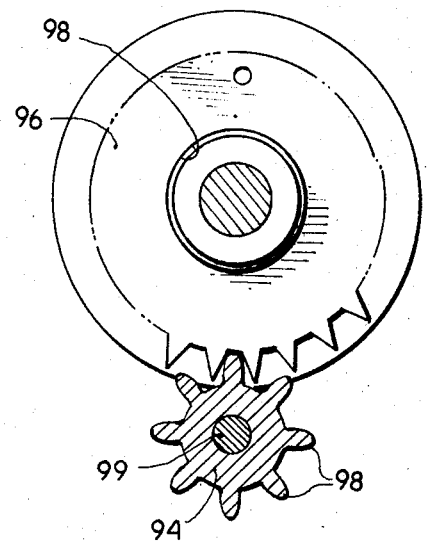
Figure 7:
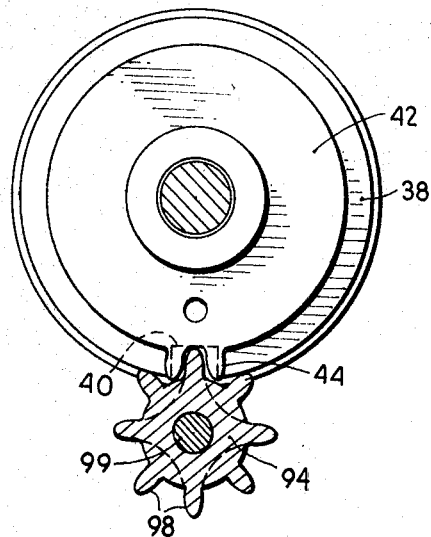
Figure 8:
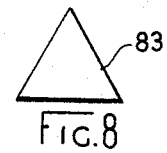
Figure 9:
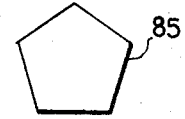
Figure 10:
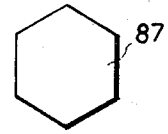

FIGURES 5, 6 and 7 are sectional views taken respectively on lines 5—5, 6—6 and 7—7 of FIGURE 3; and FIGURES 8, 9 and 10 are fragmentary detail views showing in cross section the additional shapes which can be used for the indicator blocks carrying indicia on the faces thereof.

Figure 1:
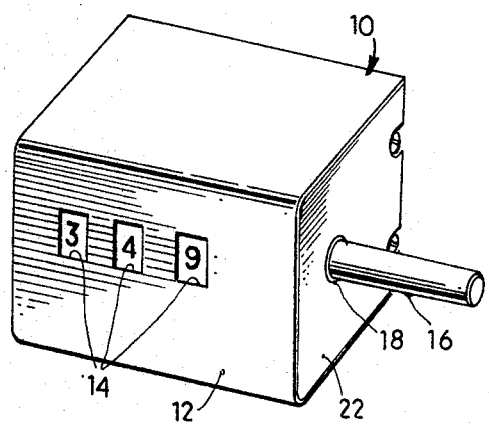
FIGURE 1 is an isometric view of the indicator device which is used to provide information either numerical, letter-type, or other such information.

Referring now to the drawings, and particularly to FIGURE 1, the indicator designated generally by reference numeral 10, is housed within a casing or cover 12, having openings 14 through which are displayed numbers or the like.

Obviously, the invention can be used to indicate any required intelligible material such as numbers, letters, symbols, or other data, depending upon the application of the indicator. In the indicator application which will be described as a selective example embodiment, reference will be made to calculating operations since these are typical of one application of the present invention, it being understood that the invention is not limited to this particular application however.

Figure 2:
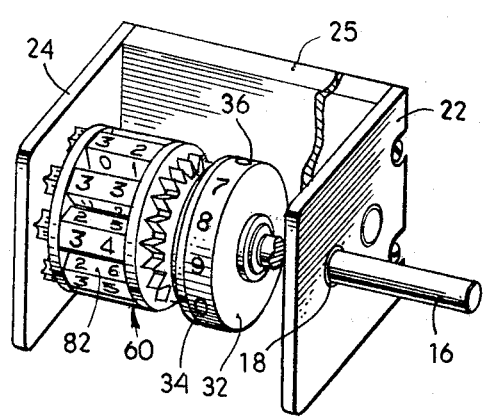
FIGURE 2 illustrates the indicator of FIGURE 1 with a portion of the outer casing removed to illustrate the interior of the indicator.
Figure 4:
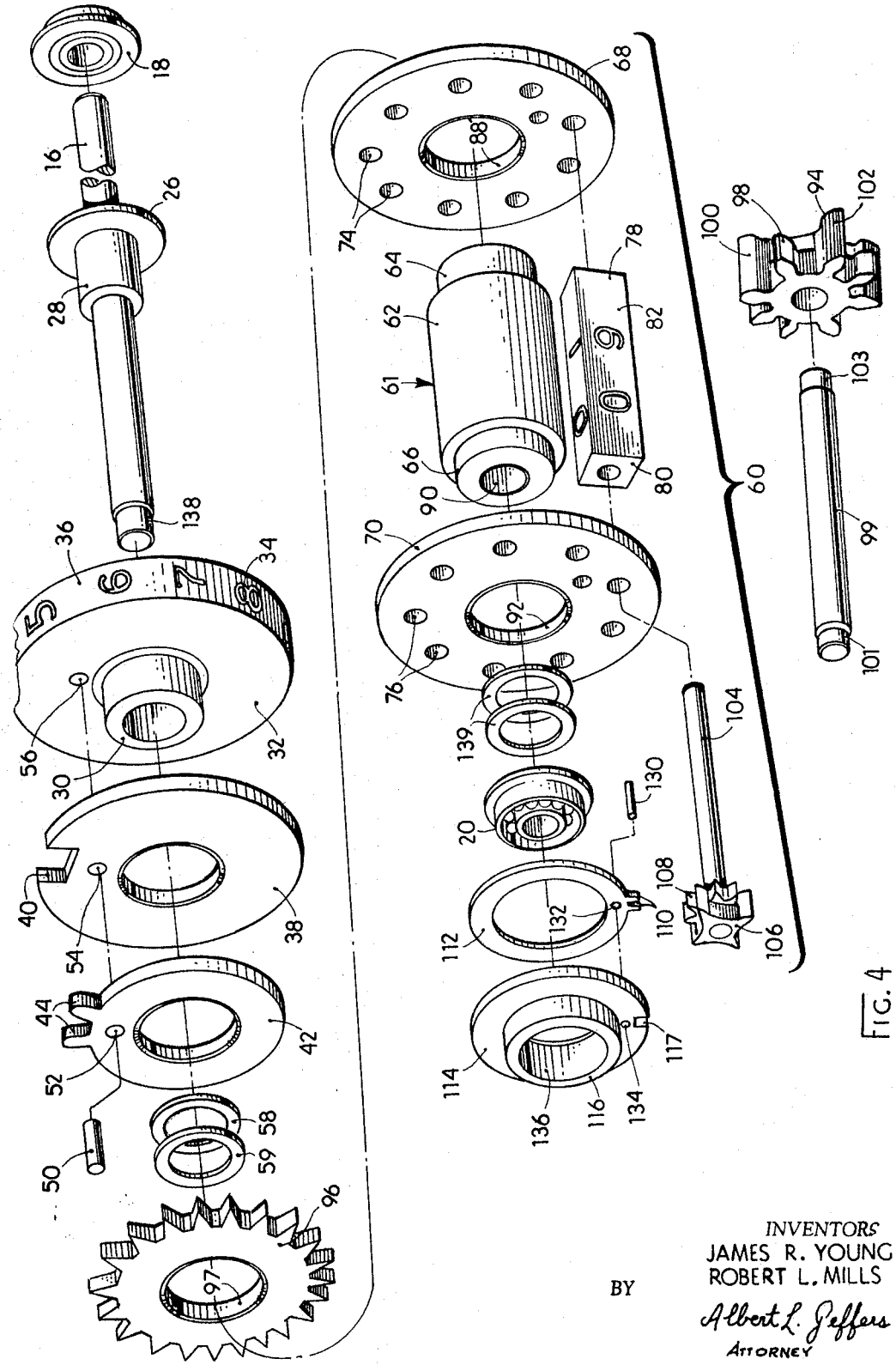
FIGURE 4 is an isometric exploded view of the indicator shown in FIGURES 2 and 3.

An input driving force or actuating source is suitably coupled to an input shaft 16 which is journalled within bearings 18 and 20 at its opposite ends, the bearings 18 and 20 being in turn supported within sides 22 and 24 of the base 25 (FIGURE 2). The drive shaft 16 includes a retaining flange 26 and boss 28 (FIGURE 4), the boss 28 being dimensioned to receive a press-fitted collar 30 of an indicating drum 32, having various numerals 34 which are imprinted in the outer periphery surface 36 (FIGURE 4).

A locking cam 38 having a notch 40 and a gear wheel 42 having gear teeth 44 are press fitted over the outer periphery of the sleeve 30 on the drum 32 and are rotatable with the drum and the boss 28 of the shaft 16. To ensure that the gear wheel 42, locking cam 38 and drum 32 rotate together, there is provided a pin 50 which fits (FIGURE 4) through aligned openings 52, 54 and 56 in the gear 42, locking cam 38 and drum 32, respectively, thereby mechanically locking these parts together for rotation.

Spacing shims 58 and 59 are added on the drive shaft 16. Also, mounted on the drive shaft 16 is a cage assembly designated generally by numeral 60 and comprised of spur gear 96 and the bracketed portion indicated at the bottom part of FIGURE 4. The cage assembly has a cylindrical portion 61 comprised of a hub 62 having reduced diameter ends 64 and 66 on which are press-fitted support plates 68 and 70, the two plates having aligned circumferentially spaced pairs of openings 74 and 76 in which is journalled the shaft 104 which supports the affixed indicator blocks 82.

Indicator blocks 82 each have at their respective faces numerals which are displayed through opening 14, and the indicator block is periodically indexed a number of degrees sufficient to bring first one face and then the next face into display position. Thus, in the case of a four-sided display block, index movement is in increments of 90 degrees and such indexing movement is achieved by the periodic movement of the cage assembly about the drive shaft which passes through aligned opening 90, of the cylinder 61 and is supported at its ends in the bearings 18 and 20 (FIGURE 3). The periodic movement or turning of the cage assembly is produced by the coaction of the transfer pinion 94 and a full-tooth gear 96 having an opening 97 and which is press-fitted onto reduced diameter end 64 of the hub 62. Each 360 degrees of rotation of the drive shaft 16 will cause the locking cam 38 and the gear 42 also to rotate 360 degrees, and the teeth 44 will then engage with the teeth 98 of the transfer pinion and cause the transfer pinion to rotate one angular increment of movement, which is determined by the number of teeth in the transfer pinion 94. At the time the teeth 44 of gear 42 mesh with the teeth 98 of the transfer pinion 94 the notch 40 of locking cam 38 meshes with one of the teeth 98 and permits such angular movement, but during the remainder of rotation of the gear teeth 44, the notch 40 rotates out of engagement with the teeth and the locking cam 38 then seats against surfaces 100 and 102 of the transfer pinion preventing any such movement of the transfer pinion except at the time when the notch 40 and gear teeth 44 are rotated in a position to drive the transfer pinion and the notch in the locking cam 38 receives one of the teeth to permit such rotation.

Each 360 degrees of rotation of the drive shaft 16 causes, therefore, through the gear 42, an increment of movement of the transfer pinion 94, which in turn meshes with the full-tooth spur gear 96, thus producing some degree of angular movement of the hub 62 and cage 60, such degree of movement depending upon the number of blocks within the cage.

The shaft 104 projects from each indicator block 82 and is provided with a pinion 106 which, in construction, resembles the transfer pinion 94. The shaft 104, together with the pinion 106, revolves about an axis, which is the axis of rotation of the drive shaft 16, and each 360 degrees of revolving movement causes the teeth 108 to come into engagement with teeth 110 of a non-rotatable, fixed gear 112 which is held stationary on the side 24 of the housing 10 and past which the pinion gear 106 is revolved, at which time the teeth 108 engage with teeth 110 causing rotation of the shaft 104 by whatever angular movement is necessary to index the indicator block 82, in this case the indexing movement comprising 90 degrees of turning of the indicator block to bring a successive face of the indicator block into display position.

Consequently, each 360 degrees revolving movement of the indicator block, about the axis of the drive shaft 16 the indicator block is indexed by one increment, and during the remainder of the revolving movement, such indexing movement is prevented by means of a locking cam 114 having a boss 116 fixedly mounted in end plate 24 of the housing 10, and held against rotation thereby. Both the locking cam 114 and the gear 112 are held stationary in locked position with respect to each other by a pin 130 (FIGURE 4) which passes through aligned openings 132 and 134, respectively. The opening 136 in the locking cam is proportioned to receive the ball bearing 20 therein which serves to journal the end 138 of the drive shaft 16.

Shims 139 are used between the ball bearings and the cage plate 70, shown at the bottom portion of FIGURE 4.

It is, of course, possible to vary the shape of the indicator blocks. For example, in some applications a four-sided indicator block is suitable and the indexing movement is then comprised of 90 degrees of indexing movement, and for other applications we have found that a triangular cross section indicator block 83 is preferred, as for example, the one shown in FIGURE 8, at which time 120 degrees of indexing movement is produced. Similarly, in FIGURES 9 and 10, five-sided and six-sided indicator blocks 85 and 87 can also be used, in which case the indexing movement is comprised of 72 degrees and 60 degrees respectively. The point is that for each 360 degrees of movement of the drive shaft, there is a successive indicator block index movement which causes a successive face to be brought into view. The indicator block is indexed each time whatever angular movement is necessary to bring a successive face into view for each 360 degrees of revolution of the indicator block about the axis of rotation of the drive shaft.

In operation, the input force is used to comminicate driving force on the drive shaft 16 causing the drive shaft to turn about its journalled ends in the bearings 18 and 20 (FIGURE 3), and there is co-rotated with the shaft the indicating drum wheel 32 with its various indicia 34 being brought into view through one of the openings 14 of the casing structure 12 (FIGURE 1). Co-rotating with the shaft is the locking cam 38 and mutilated gear 42 (FIGURES 4, 7) and each 360 degrees of movement by the gear 42 the teeth 44 will engage the teeth 98 of the transfer pinion 94 and the transfer pinion will be rotated at that time since the notch 40 of the locking cam has been rotated into position to permit such movement. At all other times the periphery of the locking cam fits within the arcuate recess between surfaces 100, 102 (FIGURE 4) and prevents such angular movement of the pinion about the idler pinion shaft 99, which is journalled at ends 101, 103 in the sides 22, 24 (FIGURE 3).

When the transfer pinion is turned angularly about the idler shaft 99, it counter-rotates by angular movement a full-tooth gear 96 whose teeth mesh with teeth 98 of the transfer pinion and thus causes the cage assembly 60 to rotate about the drive shaft 16. The cage assembly 60 is otherwise held against movement. When the cage assembly gear 96 is turned it co-rotates with it the sides 68 and 70 and hub 62, together with all of the indicator blocks 82 which are journalled at their opposite ends in the support plates 68, 70 being as many indicator blocks as there are aligned pairs of openings 74-76 of the support plates. In the example illustrated in the drawing there are nine such indicator blocks. During each 360 degrees of revolving movement of an indicator block 82 about the axis of rotation of the drive shaft 16 the indicator block is indexed by one increment sufficient to bring a succeeding one of its faces into display position. Thus, referring to FIGURE 4, the indicator block 82, being a four-sided figure is indexed 90 degrees during the course of its moving 360 degrees about the axis of rotation of the drive shaft. The 360 degree movement is in increments delivered by the operation of the transfer pinion 94. The indexing movement is achieved by means of the shaft 104 and attached pinion 106, which is structurally similar to the transfer pinion 94, the angular movement being achieved by rotation of the pinion gear 106 past the mutilated gear 112 and locking cam 114 such that the teeth 108 will mesh with stationary teeth 110, at which time the notch 117 and locking cam 114 will permit the pinion to rotate by one increment which effects whatever angular movement is necessary to bring the succeeding face of the indicator block 82 in the display position. Each of the indicator blocks 82 in the interval between reaching display position and again reaching display position, will, of necessity, move past the teeth 110 and will be indexed.

Referring next to FIGURE 2, the indicia on the indicator blocks is coordinated to provide a proper sequence, thus, the one indicator block has reference numeral 32, the next 33, the next following 34 and so forth. Assuming that the indicator is used as a calculator and follows a digital calculating sequence, when indicator block 82 having the numeral 39 has been moved into display position the next indicator block is indexed to position 40 and then all of the succeeding indicator blocks are indexed at 41, 42, 43, et. seq. One of the important applications of the present invention is its use as a twenty-four hour clock, in which case one of the wheels serves as a minute wheel and the indicia blocks on shaft 104 (assuming three-sided blocks and eight indicator blocks) will read the hours from 00 to 23.

Referring to FIGURE 5, the indicator blocks, numbering nine in all, are revolved about the axis of rotation of the drive shaft 16, and in doing so are, once for each revolution, engaged by the gear 112 and are indexed.

Similarly, the drive shaft 16 must rotate 360 degrees before causing the cage assembly to move through one increment of travel.

The various permutations of the measuring, its capacity, and the rate of measurement, are obtainable by changing the number and shape of cross section of the indicator blocks. As indicated in FIGURES 8, 9 and 10, the purpose of increasing the number of sides is to increase the order of magnitude of the numbers recordable by the device.

It will be seen, from the foregoing description of the invention, that one of the important features, which was to increase angular accuracy in the apparatus, has been effectively obtained because movement of the indicia blocks and of the cage assembly is effectively prevented by the locking cams 38 and 114 respectively until such time as the indexing movement is appropriate.

Also, it will be seen that the operation is achieved with a minimum number of gears, and that the operation is substantially reduced in complexity and number of parts over the previously used devices which were intended to perform similar functions.

While the present invention has been illustrated and described in connection with selected example embodiments, it will be understood that these are illustrative of the invention and are by no means restrictive thereof. It is reasonably to be expected that those skilled in this art can make numerous revisions and adaptations of the invention, and it is intended that such revisions and adaptations which incorporate the herein disclosed principles will be included within the scope of the following claims as equivalents of the invention.

We claim:

1. An indicator device, comprising input drive means including a rotatable drive shaft, a first unitary rotatable indicator means, including first rotatable indexing means, said rotatable indicator means providing information spaced at regular circumferential intervals around the periphery of said rotatable indicator means, a rotatable carrier means operatively indexed at each revolution of said first indicator means by said rotatable indexing means, a plurality of additional indicator means spaced at regular angular intervals about the circumference of said carrier means and each mounted for independent rotational indexing movement thereon, said additional indicator means having at least three indicating surfaces, and second rotatable indexing means including a toothed gear forming a part of each of said additional indicator means for individually indexing each of said additional indicator means, and stationary means for coordinating the rotational movement of the carrier means and the rotational indexing movements of said additional indicator means with respect to said first named indicator means to provide a sequence of coordinated movements.

2. An indicator device in accordance with claim 1 wherein the additional indicator means are comprised of regular polygonal cross section construction.

3. An indicator device in accordance with claim 1 wherein the carrier means includes a pair of spaced rotatable plates for mounting the additional indicator means.

4. An indicator device in accordance with claim 1 wherein the first rotatable indexing means includes a locking cam to prevent rotation of the carrier means except at the time the indexing means is in position to transfer rotation movement to the carrier means.

5. An indicator device, comprising input drive means including a rotatable drive shaft, a first unitary rotatable indicator means, including rotatable indexing means, said rotatable indicator means providing information spaced at regular circumferential intervals around the periphery of said rotatable indicator means, a rotatable carrier means operatively indexed by said rotatable indexing means, a plurality of additional indicator means spaced at regular intervals about the circumference of said carrier means and each mounted for independent rotational indexing movement thereon, said additional indicator means having a distinct axis of rotation to provide rotational and revolvable faces, each such faces being provided with information usable in conjunction with the information provided on said rotatable indicator means, and rotatable means including a rotatable gear forming a part of each of said additional indicator means for individually indexing each of said additional indicator means, and stationary means including a fixed gear engageable by said rotatable gear at a predetermined time for coordinating the rotational movement of the carrier means and the rotational indexing movements of said additional indicator means with respect to said first named indicator means to provide a sequence of coordinated movements.

6. An indicator device, comprising input drive means including a rotatable drive shaft, a first unitary rotatable indicator means, including a first rotatable indexing means, said rotatable indicator means providing information spaced at regular circumferential intervals around the periphery of the said rotatable indicator means, a rotatable carrier means operatively indexed by said first rotatable indexing means, a plurality of additional indicator means spaced at regular angular intervals about the circumference of said carrier means and each mounted for independent rotational indexing movement thereon, and second rotatable indexing means including a rotatable toothed gear forming a part of each of said additional indicator means for individually indexing each of said additional indicator means, and stationary means including a fixed gear engageable by said rotatable gear at a predetermined time for coordinating the rotational movement of the carrier means and the rotational indexing movements of said additional indicator means with respect to said first named indicator means to provide a sequence of coordinated movements.

References Cited by the Examiner

UNITED STATES PATENTS

| | | | |
|---|---|---|---|
| 790,075 | 5/1905 | Pfaff | 235—141 |
| 865,356 | 9/1907 | Carr | 40—76 |
| 865,681 | 9/1907 | Cole | 40—76 |
| 914,534 | 3/1909 | Throsher | 58—6 |
| 928,990 | 7/1909 | Lawson | 235—1 X |
| 1,671,553 | 5/1928 | Scheldrick | 235—140 |
| 1,699,857 | 1/1929 | Ruegger | 40—67 |
| 3,112,066 | 11/1963 | Brame | 235—1 X |

FOREIGN PATENTS

| | | |
|---|---|---|
| 70,940 | 9/1893 | Germany. |
| 483,586 | 1/1930 | Germany. |
| 15,111 | 6/1909 | Great Britain. |

RICHARD B. WILKINSON, *Primary Examiner.*

LEO SMILOW, *Examiner.*

C. G. COVELL, *Assistant Examiner.*